United States Patent [19]

Maklad

[11] 4,306,897

[45] Dec. 22, 1981

[54] METHOD OF FABRICATING FATIGUE RESISTANT OPTICAL FIBERS

[75] Inventor: Mokhtar S. Maklad, Milford, Conn.

[73] Assignee: International Telephone and Telegraph Corporation, New York, N.Y.

[21] Appl. No.: 140,900

[22] Filed: Apr. 16, 1980

[51] Int. Cl.³ .................... C03B 32/00; C03B 37/025; C03B 37/075; C03C 25/02

[52] U.S. Cl. ...................... 65/3.12; 65/18.1; 264/1.2; 264/1.4; 264/1.5; 427/45.1; 427/52; 427/126.2; 427/163

[58] Field of Search ................ 65/3 A, 3 B, 3.1, 3.11, 65/3.12, 3.31, 3.41, 18.2; 427/163, 45.1, 52, 126.2, 166, 167; 264/1.2, 1.4, 1.5; 350/96.29, 96.30, 96.33, 96.34

[56] References Cited

U.S. PATENT DOCUMENTS

| | | | |
|---|---|---|---|
| 1,771,055 | 7/1930 | Pender | 65/3.1 |
| 2,556,616 | 6/1951 | Ellis | 65/32 X |
| 3,850,689 | 11/1974 | Basche et al. | 65/3.41 |
| 3,877,912 | 8/1975 | Shiraishi et al. | 65/3.11 |
| 4,118,211 | 10/1978 | Au Coin et al. | 427/163 X |
| 4,173,393 | 11/1979 | Maurer | 65/3 B X |
| 4,183,621 | 1/1980 | Kao et al. | 350/96.30 |
| 4,227,907 | 10/1980 | Merritt | 427/163 X |

FOREIGN PATENT DOCUMENTS

| | | | |
|---|---|---|---|
| 2415052 | 10/1975 | Fed. Rep. of Germany | 65/3 A |
| 2818036 | 11/1978 | Fed. Rep. of Germany | 65/3 A |
| 51-50745 | 5/1976 | Japan | 65/3 A |
| 1185260 | 3/1970 | United Kingdom | 65/3 B |
| 1559768 | 1/1980 | United Kingdom | 65/3 A |

Primary Examiner—Richard V. Fisher
Attorney, Agent, or Firm—John T. O'Halloran; Alfred C. Hill

[57] ABSTRACT

The fatigue resistant optical fiber is fabricated by producing an optical fiber having an electrically conducting surface, heating the produced optical fiber, and coating the heated optical fiber with a material impervious to water and water vapor.

30 Claims, 2 Drawing Figures

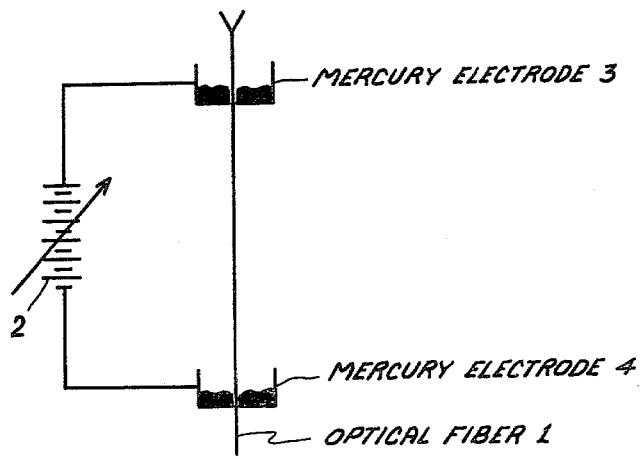
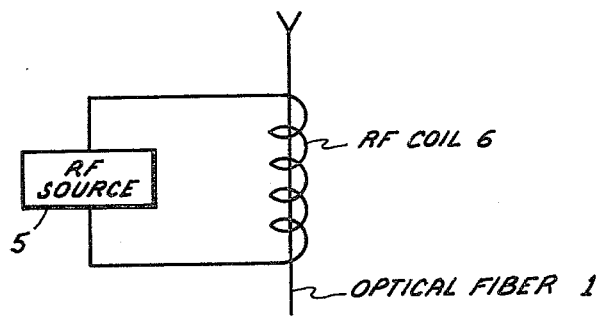

METHOD OF FABRICATING FATIGUE RESISTANT OPTICAL FIBERS

BACKGROUND OF THE INVENTION

This invention relates to optical fibers and more particularly to a method of fabricating a fatigue resistant optical filter.

SUMMARY OF THE INVENTION

An object of the present invention is to provide an improved method of fabricating a fatigue resistant optical fiber.

A feature of the present invention is the provision of a method of fabricating a fatigue resistant optical fiber comprising the steps of producing an optical fiber having an electrically conducting surface; heating the produced optical fiber; and coating the heated optical fiber with a material impervious to water and water vapor.

BRIEF DESCRIPTION OF THE DRAWING

Above-mentioned and other features and objects of this invention will become more apparent by reference to the following description taken in conjunction with the accompanying drawing, in which:

FIG. 1 is a schematic diagram of a circuit employed to provide DC (direct current) heating of the optical fiber in the heating step in the method according to the principles of the present invention; and FIG. 2 is a circuit diagram for RF (radio frequency) power heating of the optical fiber in the heating step of the method according to the principles of the present invention.

DESCRIPTION OF THE PREFERRED EMBODIMENTS

The method of fabricating a fatigue resistant optical fiber in accordance with the principles of the present invention comprises the steps of producing an optical fiber to have an electrically conducting surface, heating the produced optical fiber and coating the heated optical fiber with a material which is impervious to water and water vapor.

Basically the step of producing the optical fiber having an electrically conducting surface includes the steps of preparing an optical preform by a chemical vapor deposition technique, preparing an electrically conducting silica substrate tube containing carbon and placing the preform inside the tube. At this point in the producing step the optical fiber can be produced by two different embodiments. The first embodiment includes collapsing the tube onto the perform. The second embodiment includes the step of drawing the preform and the tube to provide the optical fiber.

The electrically conducting silica substrate tube containing carbon can be prepared as described in U.S. Pat. No. 2,556,616, issued on June 12, 1951 to R. B. Ellis.

The heating of the optical fiber having the electrically conducting surface can be accomplished by employing DC heating as illustrated in FIG. 1, wherein the optical fiber 1 having an electrically conducting surface, has a direct current voltage applied thereto from DC source 2 coupled to spaced mercury electrodes 3 and 4.

Alternately, the heating of the optical fiber having an electrically conducting surface can be provided by RF power heating as illustrated in FIG. 2 wherein the optical fiber 1 is heated by radio frequency power supplied from source 5 to RF coil 6.

There are two embodiments of the step of coating the heated optical fiber with a material impervious to water and water vapor. The first embodiment includes employing a chemical vapor deposition technique to coat the heated optical fiber with the impervious material and the second embodiment includes employing a thermal deposition technique to coat the heated optical fiber with the impervious material.

Below there are listed examples of materials and from where they are obtained to provide the impervious coating on the heated optical fiber.

(1) $Si_3N_4$ which is obtained from $SiH_4 + NH_3$ or $SiCl_4 + NH_3$.

(2) Silicone oxynitride which is obtained from $SiH_4 + NH_3 + H_2O$, or $SiCl_4 + NH_3 + H_2O$.

(3) Carbon obtained by the thermal dissociation of a hydrocarbon.

(4) Nickel obtained from the thermal dissociation of nickel carbonyl.

While I have described above the principles of my invention in connection with specific apparatus it is to be clearly understood that this description is made only by way of example and not as a limitation to the scope of my invention as set forth in the objects thereof and in the accompanying claims.

I claim:

1. A method of fabricating a fatigue resistant optical fiber, comprising the steps of:
   producing a completely formed, unsupported optical fiber having an electrically conducting surface;
   heating said produced optical fiber; and
   coating said heated optical fiber with a material impervious to water and water vapor;
   said step of producing including the steps of
      preparing an optical preform by a chemical vapor deposition technique,
      preparing an electrically conducting silica substrate tube containing carbon,
      placing said preform inside said tube, and
      collapsing said tube onto said preform to provide said produced optical fiber.

2. A method according to claim 1, wherein said step of heating includes
   direct current heating of said produced optical fiber.

3. A method according to claim 2, wherein said step of coating includes the step of
   employing a chemical vapor deposition technique to coat said heated optical fiber with said material.

4. A method according to claim 3, wherein said material is selected from a group of materials consisting of $Si_3N_4$, silicone oxynitride, carbon and nickel.

5. A method according to claim 2, wherein said step of coating includes the step of
   employing a thermal dissociation technique to coat said heated optical fiber with said material.

6. A method according to claim 5, wherein said material is selected from a group of materials consisting of $Si_3N_4$, silicone oxynitride, carbon and nickel.

7. A method according to claim 1, wherein said step of heating includes
   radio frequency power heating of said produced optical fiber.

8. A method according to claim 7, wherein
said step of coating includes the step of employing a chemical vapor deposition technique to coat said heated optical fiber with said material.

9. A method according to claim 8, wherein
said material is selected from a group of materials consisting of $Si_3N_4$, silicone oxynitride, carbon and nickel.

10. A method according to claim 7, wherein
said step of coating includes the step of employing a thermal dissociation technique to coat said heated optical fiber with said material.

11. A method according to claim 10, wherein
said material is selected from a group of materials consisting of $Si_3N_4$, silicone oxynitride, carbon and nickel.

12. A method according to claim 1, wherein
said step of coating includes the step of employing a chemical vapor deposition technique to coat said heated optical fiber with said material.

13. A method according to claim 12, wherein
said material is selected from a group of materials consisting of $Si_3N_4$, silicone oxynitride, carbon and nickel.

14. A method according to claim 1, wherein
said step of coating includes the step of employing a thermal dissociation technique to coat said heated optical fiber with said material.

15. A method according to claim 14, wherein
said material is selected from a group of materials consisting of $Si_3N_4$, silicone oxynitride, carbon and nickel.

16. A method of fabricating a fatigue resistant optical fiber, comprising the steps of:
producing a completely formed, unsupported optical fiber having an electrically conducting surface;
heating said produced optical fiber; and
coating said heated optical fiber with a material impervious to water and water vapor;
said step of producing including the steps of
preparing an optical preform by a chemical vapor deposition technique,
preparing an electrically conducting silica substrate tube containing carbon,
placing said preform inside said tube, and
drawing said preform and said tube to provide said produced optical fiber.

17. A method according to claim 16, wherein
said step of heating includes
direct current heating of said produced optical fiber.

18. A method according to claim 17, wherein
said step of coating includes the step of employing a chemical vapor deposition technique to coat said heated optical fiber with said material.

19. A method according to claim 18, wherein
said material is selected from a group of materials consisting of $Si_3N_4$, silicone oxynitride carbon and nickel.

20. A method according to claim 17, wherein
said step of coating includes the step of employing a thermal dissociation technique to coat said heated optical fiber with said material.

21. A method according to claim 20, wherein
said material is selected from a group of materials consisting of $Si_3N_4$, silicone oxynitride, carbon and nickel.

22. A method according to claim 16, wherein
said step of heating includes
radio frequency power heating of said produced optical fiber.

23. A method according to claim 22, wherein
said step of coating includes the step of employing a chemical vapor deposition technique to coat said heated optical fiber with said material.

24. A method according to claim 23, wherein
said material is selected from a group of materials consisting of $Si_3N_4$, silicone oxynitride, carbon and nickel.

25. A method according to claim 22, wherein
said step of coating includes the step of employing a thermal dissociation technique to coat said heated optical fiber with said material.

26. A method according to claim 25, wherein
said material is selected from a group of materials consisting of $Si_3N_4$, silicone oxynitride, carbon and nickel.

27. A method according to claim 1, wherein
said step of coating includes the step of employing a chemical vapor deposition technique to coat said heated optical fiber with said material.

28. A method according to claim 27, wherein
said material is selected from a group of materials consisting of $Si_3N_4$, silicone oxynitride, carbon and nickel.

29. A method according to claim 1, wherein
said step of coating includes the step of employing a thermal dissociation technique to coat said heated optical fiber with said material.

30. A method according to claim 29, wherein
said material is selected from a group of materials consisting of $Si_3N_4$, silicone oxynitride, carbon and nickel.

* * * * *